Patented Dec. 14, 1943

2,336,585

UNITED STATES PATENT OFFICE 2,336,585

CHEMICAL PROCESS

Erving Arundale, Colonia, and Louis A. Mikeska, Westfield, N. J., assignors to Standard Oil Development Company, a corporation of Delaware No Drawing. Application December 20, 1940, Serial No. 370,981

10 Claims. (Cl. 260—494)

The present invention relates to a process for the conversion of trioxymethylene (paraformaldehyde), other compounds capable of decomposing to yield anhydrous gaseous formaldehyde, or gaseous formaldehyde into the methyl ester of formic acid (methyl methanoate, methyl formate), which is a colorless liquid boiling at 31.5° C.

According to the present invention, anhydrous gaseous formaldehyde is converted to methyl formate by heating under pressure in the presence of a catalyst. The source of formaldehyde may be any of the various polymers of formaldehyde, such as trioxymethylene, other compounds capable of decomposing to yield anhydrous gaseous formaldehyde, such as methylal or other formals or gaseous formaldehyde. The catalyst used for the reaction is a volatile metallic halide such as boron fluoride, fuming stannic chloride, aluminum chloride, silicon tetrachloride, titanium tetrachloride, or the like. The weight ratio of catalyst to formaldehyde in the reactor charge should be at least one to ten. The reaction takes place readily at temperatures above 50° C. and as high as 150° C., while 100° C. is the preferred reaction temperature. Since formaldehyde is gaseous above —92° C., a pressure vessel must be used for the reaction. No induction period is involved in carrying out this reaction, and it is complete within a few hours, generally within 4 hours or less. When trioxymethylene is the source of formaldehyde, the completion of the reaction is evidenced by the disappearance of the solid trioxymethylene in the reaction mixture. Anhydrous reactant and catalyst should be used in the reaction. When the reaction is over, the methyl formate is distilled from the catalyst, and the latter can then be used in converting more formaldehyde to methyl formate.

The following example is given as illustrating but not in any way limiting the invention:

100 parts by weight of trioxymethylene and 22.3 parts by weight of fuming stannic chloride were placed in a pressure vessel, and the whole was heated overnight at 100° C. The resulting reaction mixture was subjected to fractionation, and 60 parts by weight of methyl formate boiling at 32° C. were thus obtained.

What is claimed is:

1. The method of producing methyl formate which comprises contacting a compound selected from the group consisting of gaseous formaldehyde and compounds capable of decomposing to yield formaldehyde with a volatile metal halide catalyst selected from the group consisting of fuming stannic chloride, silicon tetrachloride and titanium tetrachloride, under pressure and at a temperature of from 50° C. to 150° C.

2. The method of producing methyl formate which comprises contacting trioxymethylene with a volatile metal halide catalyst selected from the group consisting of fuming stannic chloride, silicon tetrachloride and titanium tetrachloride, under pressure and at a temperature between 50° C. and 150° C.

3. The method of producing methyl formate which comprises contacting trioxymethylene with fuming stannic chloride under pressure and at a temperature between 50° C. and 150° C.

4. The method of producing methyl formate which comprises contacting a compound selected from the group consisting of gaseous formaldehyde and compounds capable of decomposing to yield anhydrous gaseous formaldehyde with fuming stannic chloride under pressure and at a temperature between 50° and 150° C.

5. The method of producing methyl formate which comprises contacting a compound selected from the group consisting of gaseous formaldehyde and compounds capable of decomposing to yield anhydrous gaseous formaldehyde with fuming stannic chloride under pressure and at a temperature of approximately 100° C.

6. The method of producing methyl formate which comprises contacting trioxymethylene with fuming stannic chloride under pressure and at a temperature of approximately 100° C.

7. The method of producing methyl formate which comprises contacting trioxymethylene with silicon tetrachloride under pressure and at a temperature of approximately 100° C.

8. The method of producing methyl formate which comprises contacting trioxymethylene with titanium tetrachloride under pressure and at a temperature of approximately 100° C.

9. The method of producing methyl formate which comprises contacting 100 parts by weight of trioxymethylene with at least 10 parts by weight of fuming stannic chloride under a pressure at least equal to the vapor pressure of the reaction mixture at the reaction temperature and at a temperature of approximately 100° C.

10. The method of producing methyl formate which comprises contacting 100 parts by weight of trioxymethylene with at least 10 parts by weight of fuming stannic chloride under a pressure at least equal to the vapor pressure of the reaction mixture at the reaction temperature and at a temperature of approximately 100° C., and recovering the methyl formate from the reaction mixture.

ERVING ARUNDALE.
LOUIS A. MIKESKA.